United States Patent
Wiese et al.

(10) Patent No.: US 6,434,119 B1
(45) Date of Patent: Aug. 13, 2002

(54) INITIALIZING COMMUNICATIONS IN SYSTEMS USING MULTI-CARRIER MODULATION

(75) Inventors: Brian Wiese, San Carlos; Krista Jacobsen, Mountain View; Nicholas P. Sands, Menlo Park; Jacky Chow, Mountain View, all of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/111,295

(22) Filed: Jul. 7, 1998

Related U.S. Application Data

(60) Provisional application No. 60/078,549, filed on Mar. 19, 1998.

(51) Int. Cl.[7] .............................................. H04L 27/00
(52) U.S. Cl. ........................ 370/252; 370/480; 375/222; 375/260
(58) Field of Search ................................ 370/204, 210, 370/252, 480, 503, 507; 375/219, 220, 222, 356, 377, 260

(56) References Cited

U.S. PATENT DOCUMENTS

| | | | | |
|---|---|---|---|---|
| 5,933,454 A | * | 8/1999 | Cioffi ......................... | 375/260 |
| 6,021,158 A | * | 2/2000 | Schurr et al. ................ | 375/211 |
| 6,128,348 A | * | 10/2000 | Kao et al. .................... | 375/260 |
| 6,134,283 A | * | 10/2000 | Sands et al. ................. | 375/354 |
| 6,181,714 B1 | * | 1/2001 | Isaksson et al. ............ | 370/491 |

OTHER PUBLICATIONS

American National Standards Institute (ANSI), Network and Customer Installation Interfaces—Asymmetric Digital Subscriber Line (ADSL) Metallic Interface Aug. 18, 1995, pp. 1–170.

* cited by examiner

Primary Examiner—Min Jung
(74) Attorney, Agent, or Firm—Beyer Weaver & Thomas, LLP

(57) ABSTRACT

A variety of methods of initializing a connection between a remote modem and a central unit in a communication system that utilizes a multi-carrier modulation scheme are described. In one aspect of the invention, a relatively long duration single frequency activation signal that ramps up and ramps down in intensity is utilized. In a preferred embodiment, the activation signal is transmitted on a subcarrier that is outside a range of sub-channels used for data transmission in the multi-carrier modulation scheme. In a separate aspect of the invention, an initialization sequence that includes central synchronization signal, a remote synchronization signal, a central setup signal, a remote setup signal, a central setup complete signal a remote message and a central message. The central unit transmits a central setup complete signal when it has completed a central setup procedure. However, the remote message is only sent after the remote unit has both completed the remote setup procedure and received the central setup complete signal. In one preferred embodiment, during a first superframe of each of the described signals, the transmitting unit sends only header symbols which constitute a first predetermined pattern in order to help clearly define a transition in signals. In some embodiments, in the event that an error is detected, the unit that detects the error transmits designated error symbols which constitute a second predetermined pattern. In another aspect of the invention, a plurality of header symbols having a first predetermined pattern are transmitted during a first superframe of the central setup signal. A sequence of training symbol sets are then transmitted during a plurality of following superframes of the central setup signal. Further, during the transmission of the central setup complete signal, the sequence of training symbol sets continue to be retransmitted and a designated symbol in each superframe that is not to be used by the remote unit to obtain training information is set to a state indicative of the completion of the central setup procedure. With this arrangement a synchronous setup of the central unit and the remote unit is facilitated since the remote unit may continue to receive the training symbol set even after the central setup procedure has been completed.

26 Claims, 9 Drawing Sheets

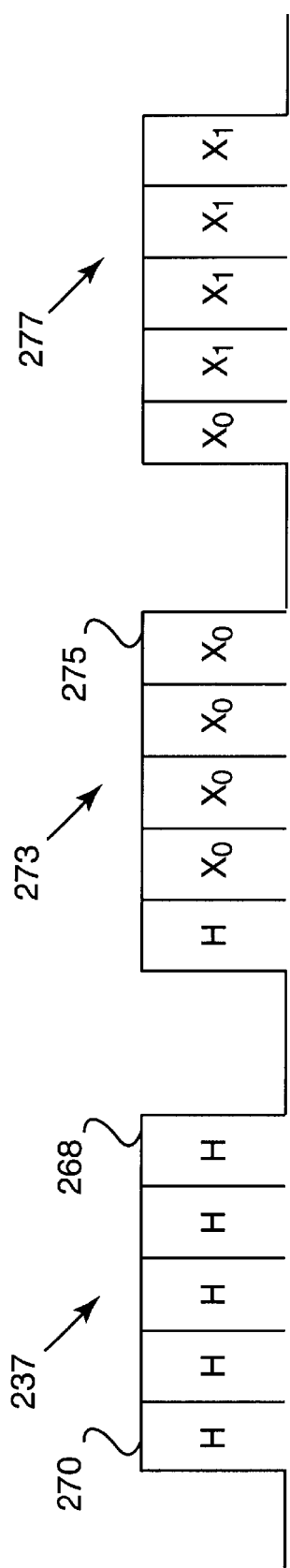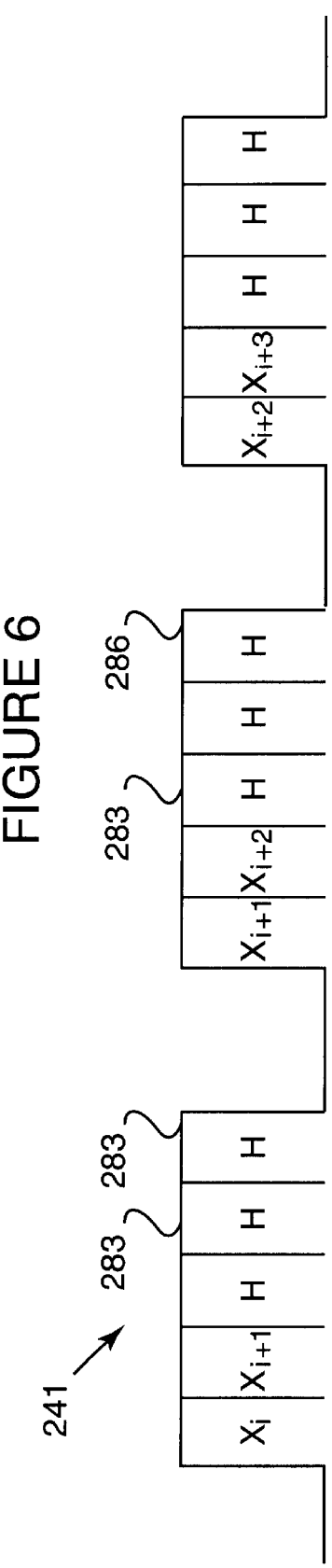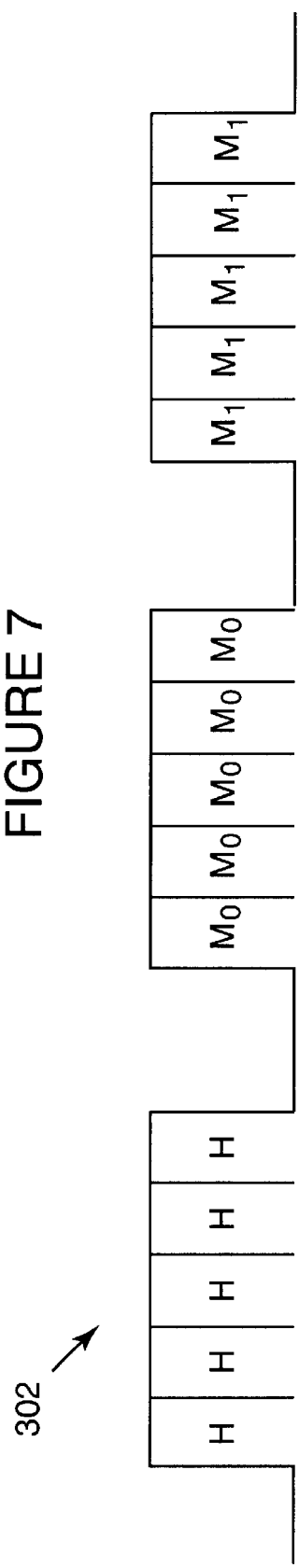

INITIALIZING COMMUNICATIONS IN SYSTEMS USING MULTI-CARRIER MODULATION

This application claims the priority of provisional application Serial No. 60/078,549, filed Mar. 19, 1998 and entitled MULTI-CARRIER INITIALIZATION PROCEDURE, which is incorporated herein by reference in its entirety.

BACKGROUND OF THE INVENTION

The present invention relates generally to initialization procedures for high speed bi-directional communication systems. More particularly, it relates to initialization procedures that are particularly well suited for communication systems employing multi-carrier modulation schemes.

With the increasing popularity of the Internet, video conferencing and other communications systems that require the transmissions of relatively large quantities of data to households and businesses, there have been corresponding demands for higher speed modems for use in bidirectional communications. Given the inherent limitations of single carrier modulation schemes, there has been an increasing interest in the use of multi-carrier modulation schemes. Some of the more popular systems contemplate the use of digital subscriber lines (e.g. telephone lines), cable lines, and various radio interfaces. In many of the proposed applications, point to multi-point transmission schemes are contemplated. By way of example, at the time of this writing, the Alliance For Telecommunications Industry Solutions (ATIS), which is a group accredited by the ANSI (American National Standard Institute) Standard Group is working on the next generation subscriber line based transmission system, which is referred to as the VDSL (Very High-Speed Digital Subscriber Line) standard. The VDSL standard is intended to facilitate transmission rates of up to 51.92 Mbit/s. Simultaneously, the Digital, Audio and Video Council (DAVIC) is working on a short range system, which is referred to as Fiber To The Curb (FTTC). A number of multi-carrier modulation schemes have been proposed for use in the VDSL and FTTC standards (hereinafter VDSL/FTTC). One proposed multi-carrier solution utilizes discrete multi-tone (DMT) signals in a system that is similar in nature to the ADSL standard that was recently adopted by ANSI for a slightly lower speed system. Other proposed modulation schemes include carrierless amplitude and phase modulated (CAP) signals; discrete wavelet multi-tone modulation (DWMr); and OFDM which is a simplified version of DMT.

A typical subscriber line based telecommunications local loop is illustrated in FIG. 1a. As seen therein, a unit 10 at a central location communicates with a remote units $R_1$ over a discrete transmission line 18. Simultaneously, other units at the central location communicate with other remote units over different lines in the same cable. A variety of transmission media can be used as the transmission line. By way of example, coaxial cables, twisted pair phone lines, and hybrids that incorporate two or more different media all work well. This approach also works well in wireless systems. The remote units 22 may be end user units that may exist in a home, office or the like. Typically a number of remote units 22 are serviced by a particular central office. In currently installed systems, the remote units are often telephones, however, they may be fax lines, computer terminals, televisions or a wide variety of other devices capable of connecting to the "phone lines". The central unit 10 may include a transceiver 32 for each line that is functionally broken into a transmitter 34 and a receiver 36.

In some embodiments, the central unit is a master server located at a central office that originates the communications. In other embodiments, the "central unit" may be a lower level distribution component in the system architecture that receives and retransmits signals. One embodiment of such a distribution component is illustrated in FIG. 1b. As seen therein, a trunk line 52 terminates at a distribution unit 54. In the embodiment shown, the trunk line takes the form of a fiber optic cable and the distribution unit takes the form of an optical network unit (ONU). The distribution unit 54 communicates with a plurality of remote units $R_1$–$R_N$ over discrete lines 18, which again, may take the form of conventional twisted pair phone lines. As in the previously described embodiment, the remote units may be end user units that may exist in a home, office or the like. Typically a number of remote units are serviced by a particular ONU. By way of example, in North America, typical ONUs may service on the order of 4 to 96 remote units. In this embodiment, the ONU receives downstream source signals over one or more trunk lines and transmits the information embodied therein to the appropriate remote units as downstream communication signals. Similarly, the ONU receives upstream communication signals from the remotes and transmits the information embodied therein as upstream source signals. The source signals may be passed to a central office, another distribution unit or any other suitable location. A service provider would typically be arranged to provide the data to the central modem for transmission to the remote units 22 and to handle the data received by the central modem from the remote units. The service provider can take any suitable form. By way of example, the service provider can take the form of a network server. The network server can take the form of a dedicated computer or a distributed system.

The distance between the central unit 10, 54 and the furthest remote may vary a fair amount. By way of example, it is expected that in the VDSL/FTTC standards, twisted pair loop lengths of up to 1000 feet (300 meters) will be permitted for downstream communications at 51.92 MHz. Similarly, loop lengths of up to 3000 feet (900 meters) may be permitted for downstream communications at 25.96 MHz and loop lengths of up to 5000 feet (1500 meters) may be permitted for downstream communications at 12.97 MHz. As will be appreciated by those skilled in the art, shorter maximum loop lengths generally correspond to higher achievable data rates.

With any of the proposed multi-carrier modulation schemes, one problem that must be addressed is how to initialize a communication between the modems. Although a wide variety of initialization schemes have been proposed for multi-carrier communication systems, there are continued needs for improved initialization schemes.

SUMMARY OF THE INVENTION

In accordance with the purpose of the present invention, a variety of methods of initializing a connection between a remote modem and a central unit in a communication system that utilizes a multi-carrier modulation scheme are described.

In one aspect of the invention, a relatively long duration single frequency activation signal that ramps up and ramps down in intensity is utilized. In a preferred embodiment, the activation signal is transmitted on a sub-carrier that is outside a range of sub-channels used for data transmission in the multi-carrier modulation scheme. The activation signal may have a duration of a plurality of symbols, as for example a superframe.

In a separate aspect of the invention, a central synchronization signal is transmitted from the central unit to a remote unit. The central synchronization signal may be either in response to a remote activation signal, or initiated at the central unit. The remote unit returns a remote synchronization signal and the central unit replies with a central setup signal from the central unit to the remote unit in response to the remote synchronization signal. The remote then transmits a remote setup signal. The central unit is further arranged to transmit a central setup complete signal when it has completed a central setup procedure. The remote is also arranged to transmit a remote message after it has completed a remote setup procedure. However, the remote message is only sent after the remote unit has both completed the remote setup procedure and received the central setup complete signal. A central message is sent by the central unit after the remote message has been received by the central unit. The remote transmits a remote ready signal after the central message has been received and a central ready signal is sent from the central unit in response to the remote ready signal.

In one preferred embodiment, during a first superframe of each of the described signals, the transmitting unit sends only header symbols which constitute a first predetermined pattern in order to help clearly define a transition in signals. In some embodiments, in the event that an error is detected, the unit that detects the error transmits designated error symbols which constitute a second predetermined pattern.

In another aspect of the invention, a plurality of header symbols having a first predetermined pattern are transmitted during a first superframe of the central setup signal. A sequence of training symbol sets are then transmitted during a plurality of following superframes of the central setup signal. Further, during the transmission of the central setup complete signal, the sequence of training symbol sets continues to be retransmitted and a designated symbol in each superframe that is not to be used by the remote unit to obtain training information is set to a state indicative of the completion of the central setup procedure. With this arrangement a synchronous setup of the central unit and the remote unit is facilitated since the remote unit may continue to receive the training symbol set even after the central setup procedure has been completed.

In some embodiments, the central setup signal includes training signals. Sub-carrier line parameters are computed at the remote unit based at least in part on an analysis of the received training signals. The computed sub-carrier line parameters are then transmitted to the central unit as part of the remote message. The central unit then calculates a desired sub-carrier bit distribution based at least in part upon the received sub-carrier line parameters. The desired sub-carrier bit distribution is then transmitted to the remote unit as part of the central message.

BRIEF DESCRIPTION OF THE DRAWINGS

The invention, together with further objects and advantages thereof, may best be understood by reference to the following description taken in conjunction with the accompanying drawings in which:

FIG. 6 is a timeline illustrating one embodiment of the central set up signal illustrated in FIG. 5.

FIG. 7 is a timeline illustrating one embodiment of the set up complete signal illustrated in FIG. 5.

FIG. 8 is a timeline illustrating one embodiment of the remote message signal illustrated n FIG. 5.

DETAILED DESCRIPTION OF THE PREFERRED EMBODIMENTS

Figure 1A:
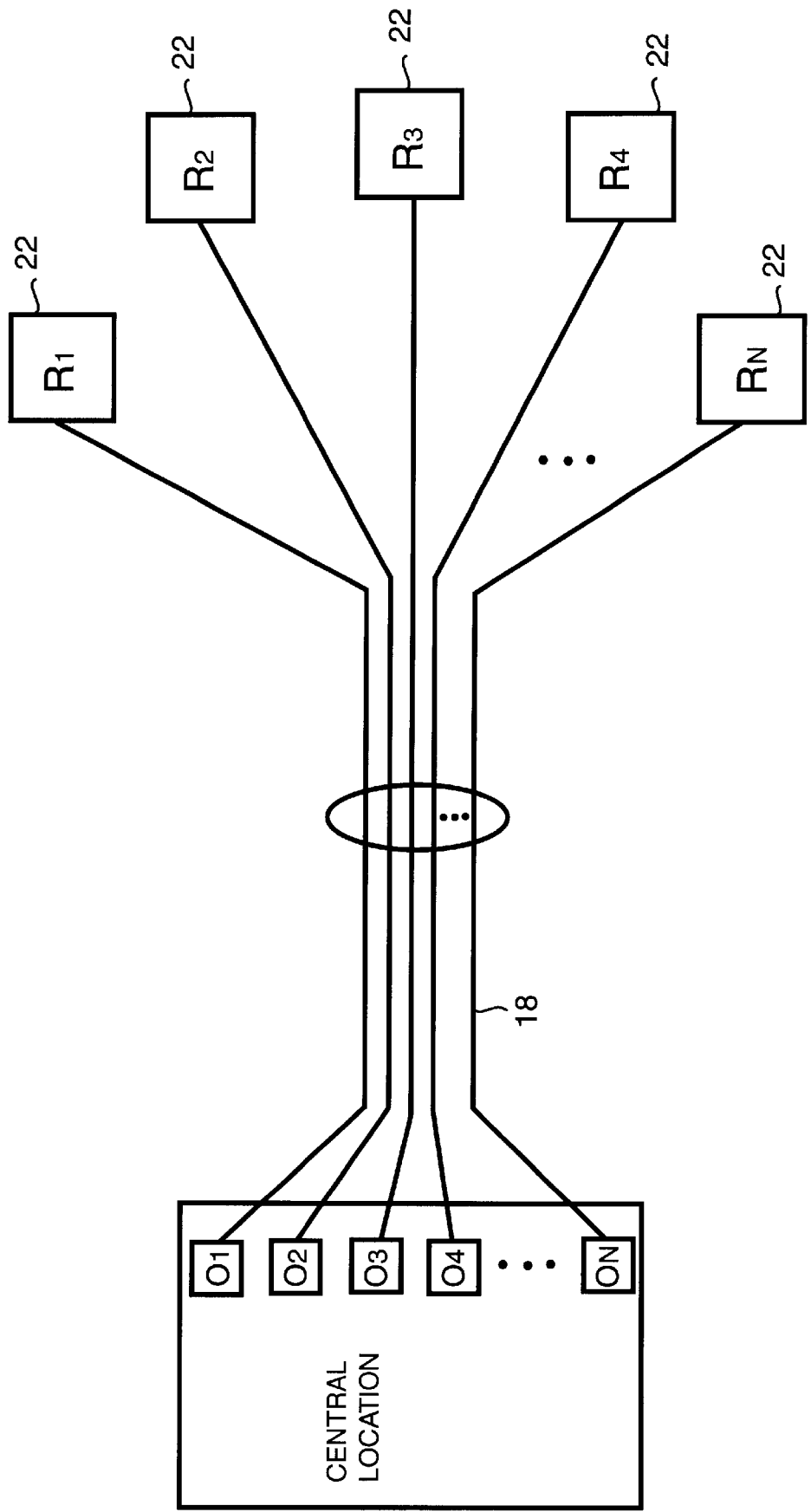
FIG. 1a is a block diagram of a subscriber line based communication system having a plurality of twisted pair phone lines that extend from a central unit to respective remote units.
Figure 1B:
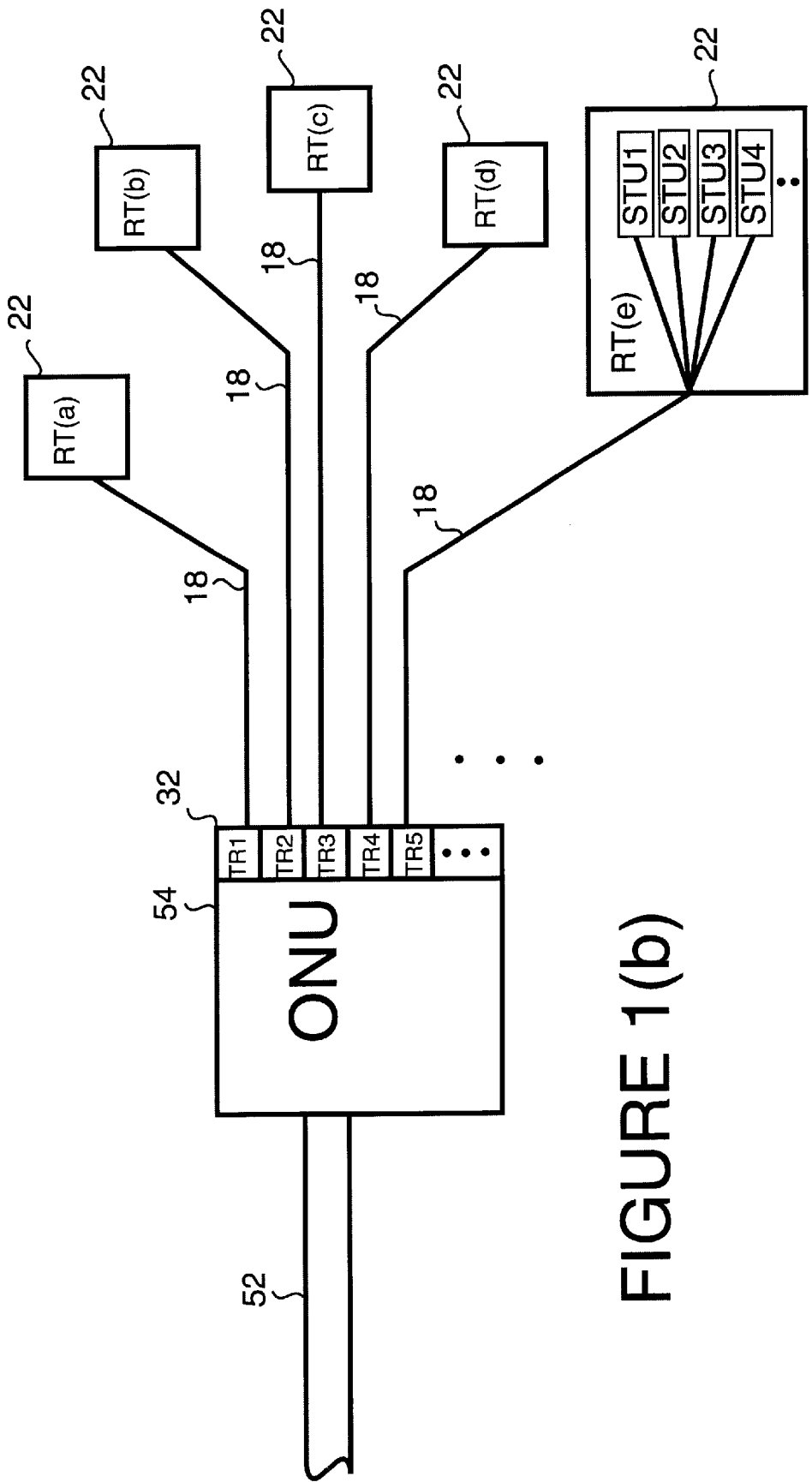
FIG. 1b is a particular case of FIG. 1a in which the central unit takes the form of an optical network unit that acts as a junction between an optical fiber trunk line and a plurality of twisted pair lines.
Figure 2:
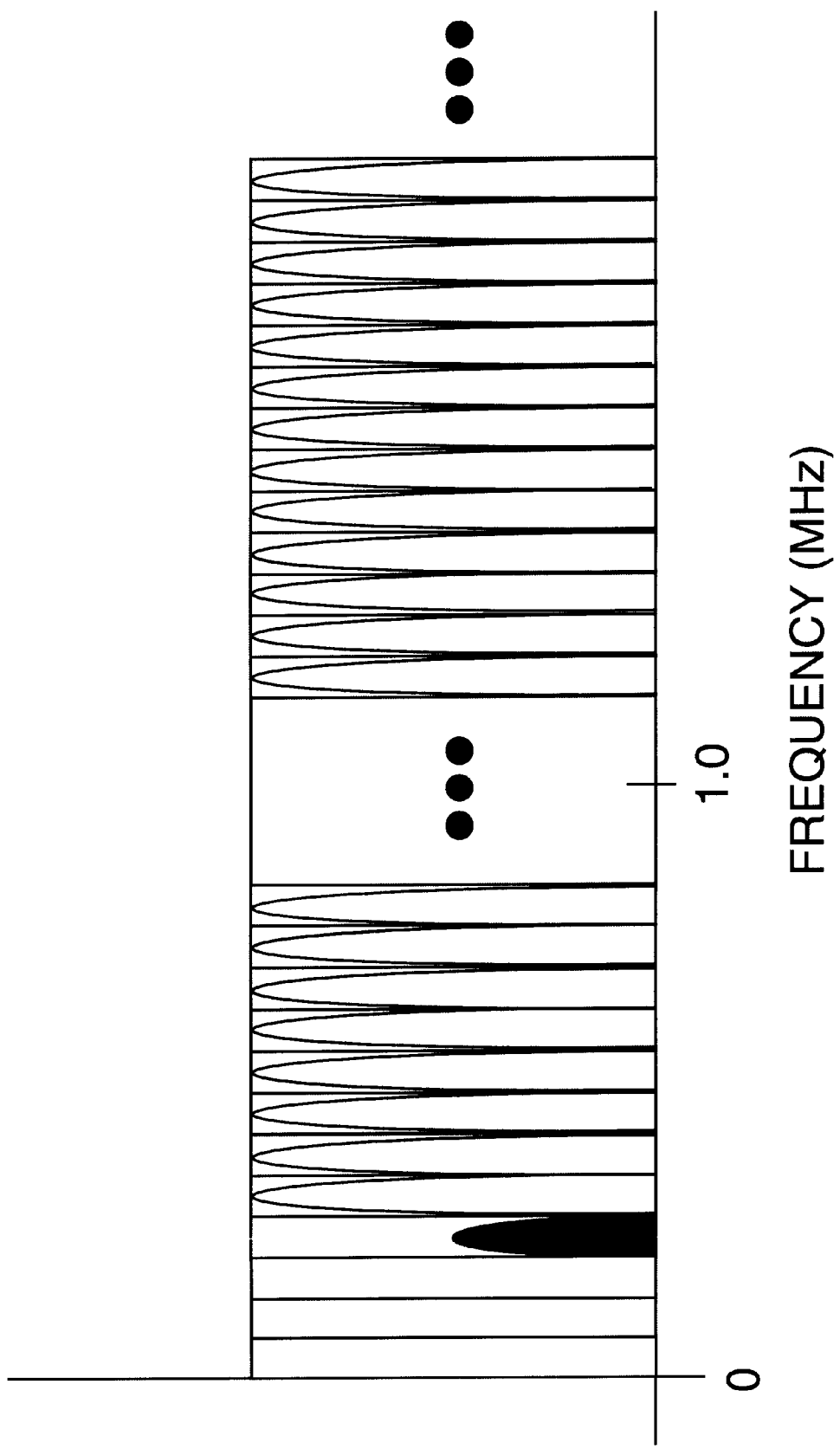
FIG. 2 is a frequency diagram illustrating the use of a multiplicity of frequency delimited sub-channels in a multi-carrier transmission scheme.

In the following descriptions, a number of mechanisms suitable for assisting with the initialization of a connection between a remote unit and a central unit in communication systems that uses a multi-carrier modulation scheme are described. As will be appreciated by those skilled in the art, in most proposed multi-carrier transmission schemes, there are a number of sub-channels that are not used to transmit data due to concerns about emitting and/or receiving signals that interfere with other existing communication systems such as POTS and ISDN lines as well as amateur radio. By way of example, a VDSL proposal using DMF modulation contemplates the use of 256 "tones" or "sub-channels" that are each 43.125 kHz wide as illustrated in FIG. 2. The lowest subchannels of the spectrum are not used for data transmission due to concerns about interference with POTS and ISDN signals present on the same lines as the VDSL signals.

Figure 3A:
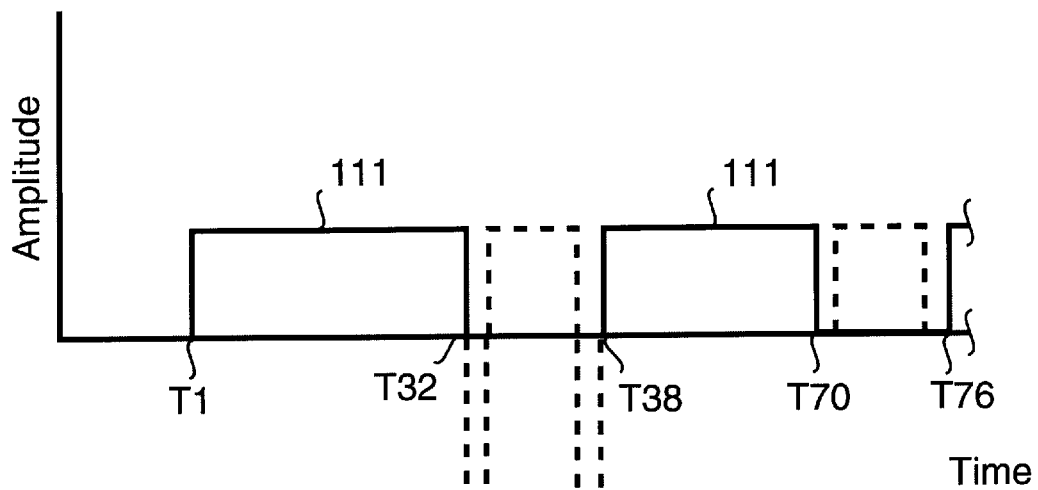
FIGS. 3a and 3b are each graphs illustrating a time domain duplexed transmission scheme for a single communication line with FIG. 3a representing downstream communication and FIG. 3b representing upstream communications.
Figure 3B:
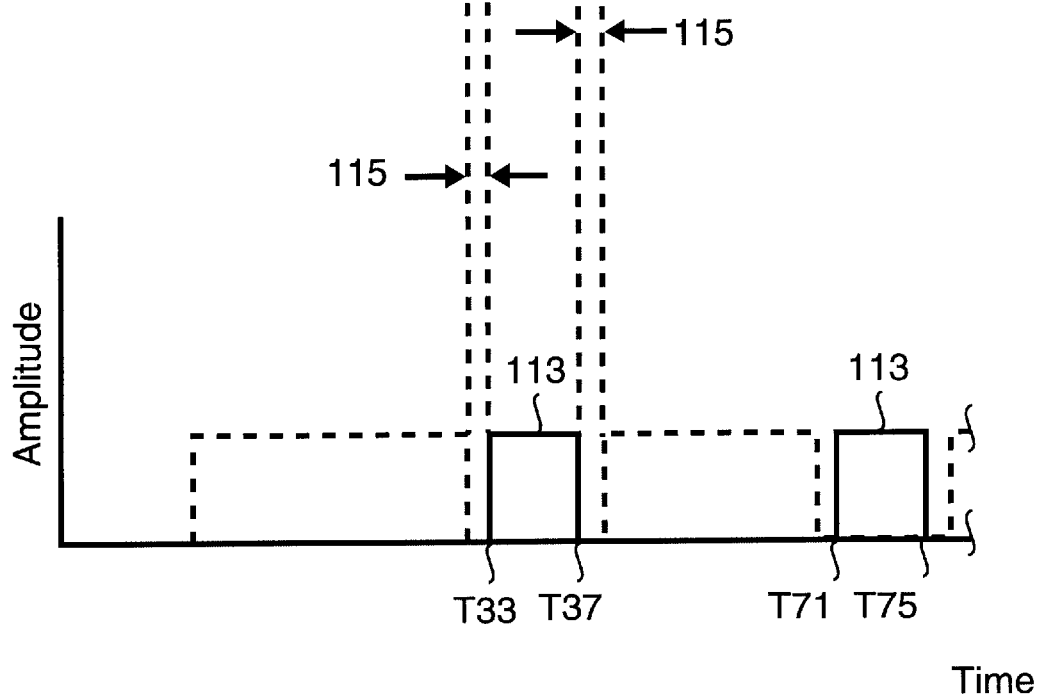

The upstream and downstream communications in bi-directional multi-carrier transmission schemes are typically separated using either time division multiplexing or frequency division multiplexing. By way of example, in the ADSL standard, frequency division multiplexing with echo canceling is used, while in a proposed VDSL standard, time division multiplexing is used. In other systems with appropriate echo canceling and filtering, simultaneous bi-directional communications may be used. In the primary embodiments described herein, time division duplexing is used. However, it should be appreciated that the inventions are equally applicable to other multiplexing schemes such as frequency division multiplexing and code division multiplexing. A representative time division duplexing data transmission scheme is illustrated in FIGS. 3(a) and 3(b). As seen therein, the downstream communications (illustrated in FIG. 3(a)), are transmitted during periodic downstream communication periods 111. The upstream communications (illustrated in FIG. 3(b)), are transmitted during periodic upstream communication periods 113 that are interspersed between associated downstream communication periods. In the embodiment shown, quiet periods 115 are provided at each transition between the downstream and upstream communication periods. The combined time from the beginning of a first downstream communication period to the beginning of the next downstream communication period is referred to herein as a "superframe". The actual duration of the upstream, downstream and quiet periods as well as the superframe may generally all be varied in accordance with the needs of a particular system. Most very high speed data transmission schemes are frame based systems that have discrete symbols. In such systems, the number of symbols that constitute a "downstream communication period" and an "upstream communication period" will be integer numbers of symbols. It is easiest for the quiet times to sum to an integer number of, although this is not strictly required. In very high speed systems, it is also generally preferable to synchronize the downstream transmissions on all lines that share a single binder to occur at the same time. This is because if downstream transmissions on some lines occur at the same time as upstream transmissions on other lines, intra-binder interference can occur and degrade system performance.

Figure 4:
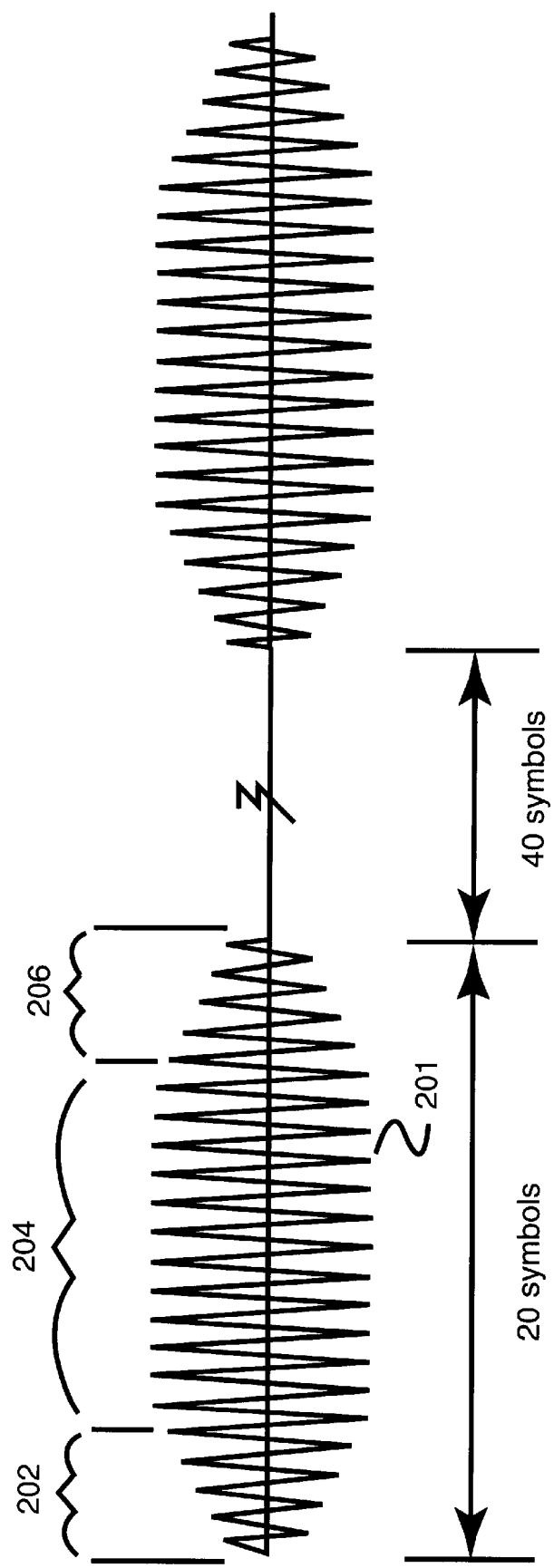
FIG. 4 is a timeline illustrating a remotely initiated activation signal in accordance with one embodiment of the present invention.

When a remote unit 22 desires to establish a connection, it must activate the central unit 10 without disrupting any of the other active connections. Thus, the remote unit typically sends an activation signal to the central unit. Referring next to FIG. 4, a remote activation signal in accordance with one embodiment of the present invention will be described. In the described embodiment, the remote activation signal 201 is a relatively long duration single frequency signal that begins with a ramp-up and ends with a ramp-down. After the remote activation signal is transmitted, the remote unit 22 listens for an appropriate response from the central unit. The gradual ramping up and ramping down of the remote initialization signal insures that leakage into adjacent sub channels (i.e. cross-channel interference) is reduced, thereby minimizing its effect on established connections on neighboring lines. Although the form of the remote activation signal 201 is quite simple, its characteristics have been chosen to facilitate a number of goals. One goal is to permit a very simple detector to be used for detecting the remote activation signals. This gives modem designers a great deal of flexibility in their system design. For example, the provision of a relatively simple remote activation signal permits the central unit to employ a relatively simple "analog ear" to detect the activation signal. Thus, in a system where power consumption of various components in the central unit is a concern, the "analog ear" can be used to detect the remote initialization signal and any digital components that may be required to handle normal communications may be turned off or put in a "sleep" state if they are not otherwise in use. Of course, in systems which don't care to employ such an analog ear, the digital components could readily be configured to detect remote activation signals.

The duration, the ramp up period and ramp down period of the remote activation signal 201 illustrated in FIG. 4 may be widely varied in accordance with the needs of any particular system. By way of example, in the described embodiment the duration of the remote activation signal is one super-frame. However, in other embodiments, shorter or longer signals may be provided as for example, a portion of a super-frame or multiple super-frames. In a particular example system having a twenty symbol super-frame, the total duration of the remote activation signal may be the entire super-frame with a ramp up portion 202 occupying two symbols, a constant intensity portion 204 constituting 16 symbols and a ramp down portion 206 constituting the final two symbols. After the remote activation signal is transmitted, nothing else is transmitted from the remote unit for a period of time sufficient for the remote activation signal to be transmitted to the central unit and an appropriate response be formulated by the central unit and returned to the remote unit. By way of example, in the described system the wait period may be two super-frames, although again significantly shorter or longer wait periods may be used. In the event that no response is received from the central unit, the remote initialization signal is periodically re-transmitted until an appropriate response is received. Similarly, the duration of the ramp up and ramp down portions of the remote activation signal may be widely varied as well.

In some systems it may be desirable to begin by transmitting the remote initialization signal at a relatively low power level. Then, if the central unit does not detect the first transmission of the remote initialization signal, the signal would be sent at a somewhat higher power level the second time and so on, until acknowledgment is received. Even in such systems, it is contemplated that in most situations, (and probably a vast majority of situations), only one remote activation signal would be required to initiate a connection. The remote initialization signal can be transmitted repeatedly until a connection is established. In some embodiments it may be desired to time out the remote initialization signal if no acknowledgment is received within a reasonable period of time. Alternatively, no time-out could be associated with the following remote signal which would effectively assume that the remote user will eventually turn off the remote modem if a connection is not established within a reasonable period of time.

To minimize interference with established connections on other lines, a low-index sub-channel that is outside the band of sub-channels used to transmit data is preferably used to carry the activation signal. In most applications, the lower four subchannels of the spectrum are not used for data transmission due to concerns about interference with POTS and ISDN signals. The described remote activation signal 201 works well with such an approach. For example, in the described embodiment, the remote initialization signal is transmitted on tone 4, although of course it could be transmitted on any appropriate subchannel. If a number of subchannels are known to be available, the remote activation signal could be transmitted redundantly on multiple subchannels.

Figure 5:
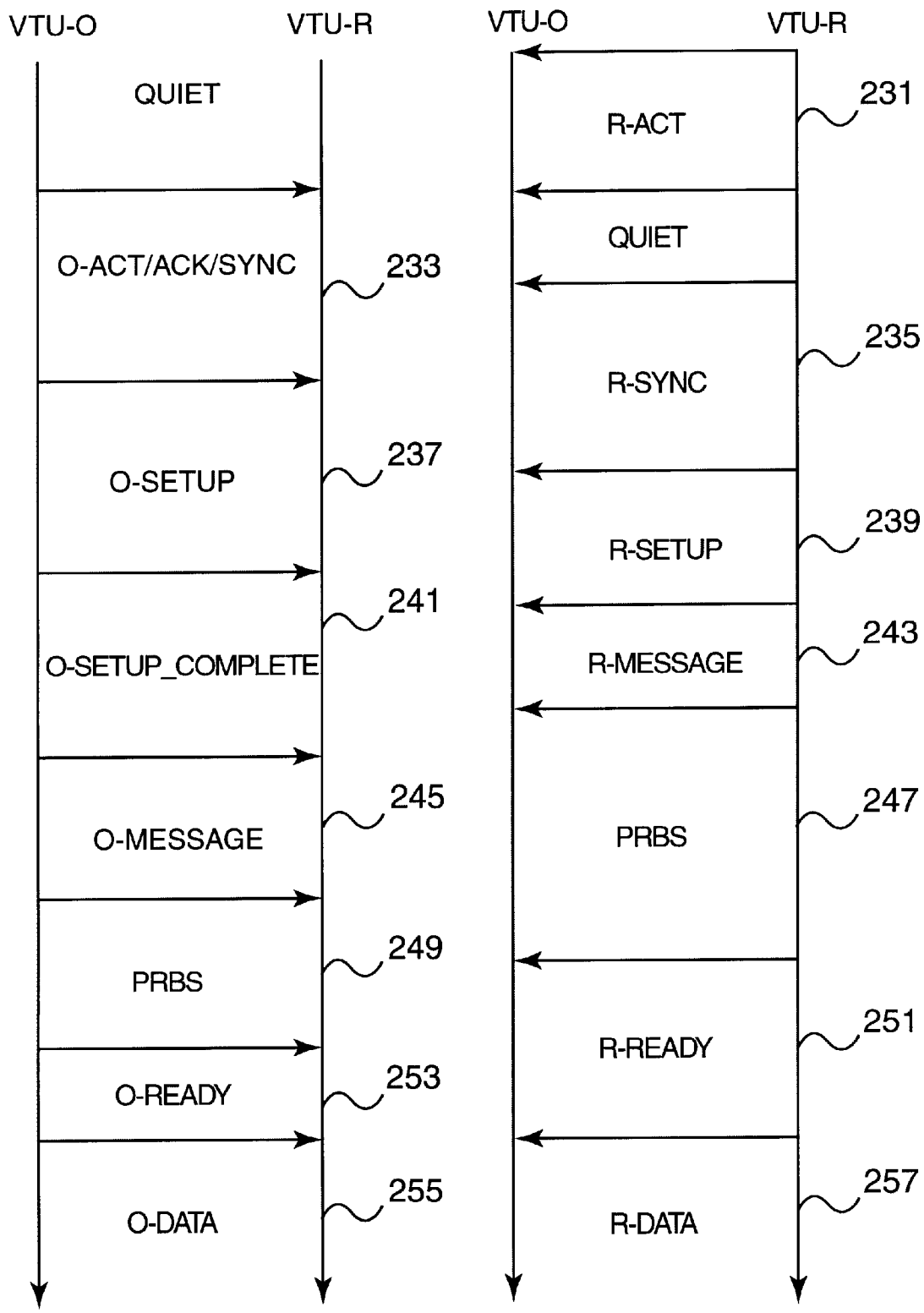
FIG. 5 is an initialization timing diagram in accordance with one embodiment of the present invention.

Referring next to FIG. 5, an initialization sequence timing in accordance with one implementation of the present invention will be described. In the embodiment shown, when a remote unit wants to initiate a connection, it begins by sending a remote activation signal 210 to the central unit 10 as described above. The central unit then responds by transmitting a central synchronization signal 233 to the remote unit 22. Alternatively, when the central unit wants to initiate a connection, it begins by sending the same central synchronization signal 233 to the remote unit. An initialization sequence with extensive handshaking then follows before data communication can begin. More specifically, in the embodiment illustrated in FIG. 5, the following sequence includes a remote synchronization signal 235, a central setup signal 237 a remote setup signal 239, a central setup complete message 241, a remote message 243, a central message 245, a remote ready signal 251, and a central ready signal 253. When both the remote unit 22 and the central unit 10 are ready, data transmission may begin. In time division duplexed embodiments, the various signals in the initialization sequence (other then the remote initialization signal 210) are transmitted only during the appropriate upstream and downstream communication periods.

As pointed out above, when the central unit 10 successfully detects the remote initialization signal 201 it returns a central synchronization signal 233 to the requesting remote unit. The central synchronization signal acknowledges receipt of the remote activation signal and provides information necessary to enable the remote unit to synchronize with the central unit. In the event that a connection is being initiated by the central unit, the central synchronization signal serves to activate the remote unit and to instruct it to synchronize. In an embodiment where the multi-carrier modulation scheme utilized is a discrete multi-tone modulation, the central synchronization signal may take the form of a cyclic sequence that is the sum of QPSK signals transmitted on a subset of the available subchannels. By way of example, subchannels 5–39 and 64 are proposed in one embodiment. The central synchronization signal is only transmitted during the downstream communications period 111 of each superframe.

When a remote unit detects the central synchronization signal it begins an appropriate synchronization procedure. By way of example, a suitable synchronization procedure is described in commonly assigned application Ser. No. 08/972,842 by Sands et al., which is incorporated herein by reference. During transmission of the central synchronization signal 233, the remote unit first determines the superframe boundaries. After the super-frames have been synchronized the symbols and sample clocks are also synchronized as described in the above referenced application. The remote unit may also compute the desired transmit power or transmit power cut back that is required based upon energy measurements of the central synchronization signal 233. By way of example, the power cutback may be implemented by providing rough adjustments to a variable gain amplifier using an appropriate energy detection algorithm.

After the remote unit has acquired super-frame and symbol synchronization, it is allowed to begin transmitting signals back to the central unit that are in synchrony with the super-frame structure. At this time the remote unit begins to transmit the remote synchronization symbol 235 which in turn is used by the central unit to perform symbol synchronization and a variety of other functions. By way of example the central unit may also perform calculations to facilitate variable gain amplifier adjustments and appropriate adjustments to the central unit transmit power level. The subchannels that are used to transmit the synchronization symbols 233 and 235 may be widely varied in accordance with the needs of any particular system. By way of example in one DMT implementation tones 5–39 are used for the synchronization signals.

After the central unit has received the remote synchronization signal it creates a central set-up signal 237 which is then transmitted to the remote unit. In the embodiment described, the central setup signal 237 contains a sequence of training symbols that are monitored by the remote unit which determines a set of channel characteristics for the various subchannels. The channel characteristics may then be used in determining the bit capacities of the various sub-channels. Any suitable training symbols may be transmitted. By way of example, the ADSL and VDSL standards each discuss training sequences that are suitable for use in multi-tone modulation schemes. In one embodiment the set-up signal includes a pseudo-random binary sequence that is transmitted only during the downstream communication periods 111 on the various sub-channels that are to used for data transmission. This structure of a central set-up signal in accordance with one embodiment of the invention will be described in more detail below with reference to FIG. 6.

Referring next to FIG. 6, the first superframe 268 of the central setup signal 237 takes the form of a plurality of identical header symbols 270. The various training signals are then sequentially transmitted in the following superframes. In the embodiment shown, the first symbol in each training superframe is the same as the last symbol in the previous superframe and the second and following symbols are the appropriate training symbol(s) for that particular superframe. Thus, the first symbol of the second superframe 273 is also a header symbol 270, while the remaining symbols in the second superframe are the first training symbol Xo 275. The first symbol of the third superframe 277 is the first training symbol Xo 275, while the remaining symbols in the third superframe are the second training symbol XI 279, and so on. This progression is then continued until all of the training symbols have been transmitted, at which time the training sequence is repeated. The training sequence is continuously repeated until the central unit has completed its setup procedure.

The first symbol of each superframe of the central setup signal 237 is described as being a repeat of the symbols from the previous superframe in order to improve intersymbol interference estimates. In systems where such intersymbol interference is not considered a major issue, such repetition would not be necessary.

The exact nature of the header symbols used in the central setup signal 237 may be widely varied, but generally it is desirable that the header symbols be readily identifiable as header symbols. In one embodiment, the header symbol takes the form of uniform tones on every other subchannel, with the intermediate tones being turned off. This has the advantage of being quickly and readily identifiable even before the communicating units have knowledge about the quality of the intervening transmission line. Of course a wide variety of other readily recognizable patterns and/or bit sequences can be used as well. In still other embodiments, the header symbols can be used to transmit small amounts of additional information as well.

In another embodiment, multiple header superframes are transmitted at the beginning of the central setup signal. This permits additional information to be transferred to the remote unit. By way of example, it may be desirable to transmit information that the remote unit may use to control its transmit spectrum. This information may be as simple as instructing the remote unit to notch the HAM radio bands to reduce radio frequency interference. Alternatively, it may involve sending a detailed power-cut-back table which would require digital spectrum shaping at the remote unit.

When the central unit 10 has completed its own setup procedures, the training sequence continues except that at least one symbol in each superframe is converted to a signal or symbol 286 that indicates that the central setup procedures have been completed. The resulting signal is referred to as the central setup complete message 241. By way of example, as illustrated in FIG. 7, the third and following symbols in each superframe of the central setup complete message 241 may be setup complete symbols 286. In other embodiments, a single signal can be used. Header symbols 270 or any other recognizable pattern may be used to indicate completion of the central setup procedures. The interesting point about the described embodiment is that the setup complete signal 241 continues to send the training sequence without any interruptions. This permits the remote unit to continue with any further training that is required, thereby permitting the central and remote units to complete their setup procedures asynchronously. When both are completed, the initialization sequence can move to the next step with the transmission of the remote message 243.

Of course, the pattern of the central setup and setup complete signals may be varied a great deal while preserving the described benefits. In the described embodiment, just one symbol is looked at per superframe. Alternatively, rather then having just one active training symbol in each superframe, two or more active training symbols could be transmitted and analyzed. By way of example, the second and third symbols of each superframe could be the analyzed symbols and the fourth symbol used to signify the completion of the setup. In many cases, the actual number of symbols that are looked at will depend on a variety of factors including the digital signal processing power that is provided for analyzing the received training signals, compatibility issues, etc.

One of the functions of the remote setup procedures is to compute the signal to noise ratios for each of the subchannels based at least in part upon the received training symbols. In modems compliant with the ADSL standard, the remote unit is responsible for calculating appropriate bit allocation tables indicative of the number of bits that can be handled by each subchannel. However such an arrangement requires a fair amount of additional intelligence in the remote units. This disadvantage is overcome in the described embodiment by the remote message 243 which transmits the signal to noise ratios detected by the remote unit back to the central unit 10. The central unit then calculates the bit allocation tables and subchannel power distribution. The calculated bit allocation tables are then transmitted back to the remote unit as part of the central message 245. This has been found to be a significant advantage.

Referring next to FIG. 8, a representative remote message 302 will be described. In the embodiment shown, the first superframe of the remote message is all header symbols (H). The remote message itself is then sent sequentially, one data symbol at a time in the following superframes. That is, a single data symbol M0, M1, M2 . . . is repeatedly transmitted during each superframe. Again, in alternative embodiments, multiple data symbols may be transmitted during each superframe of the remote message. The remote message 302 may contain a variety of pieces of information including in the described DMT embodiment, a vector of the remote's detected signal to noise ratios. The signal to noise ratios are sent to the central unit to simplify the data rate negotiation procedure that is used in DMT modulation schemes.

As with several of the signals that are transmitted during the initialization sequence, the initial superframe of the remote message is composed of a series of header symbols. In the described embodiment, they are a series of identical header symbols, although of course that is not a requirement. However, the repetitive structure makes the header superframe extremely easy to detect without requiring any significant decoding. Thus, the header superframes are well suited for marking the transition between signals transmitted by a particular modem, as for example: the transition between the central synchronization and the central setup signals 233, 237; the transition between the remote synchronization and remote setup signals 235, 239; the transition between the remote setup and remote message signal 239, 243, etc.

When the central unit receives the remote message 243, it calculates the bit allocation tables and subchannel power distribution as previously described. During this time the central unit continues to transmit the central setup complete message 241 to maintain synchronization. The calculated bit allocation tables and power distributions are then transmitted back to the remote unit as part of the central message 245. A wide variety of other information, as for example error correction, CRC and interleaving parameters may be transmitted as part of the central message as well. As with the remote message, the central message 245 may begin with one superframe of header symbols to mark the transition.

After the remote message has been transmitted, the remote unit waits for the receipt of the central message. It will be appreciated that in most multi-carrier systems, it is important that both the central and remote modems continually communicate. Thus, in one embodiment, after the remote message has been transmitted, the remote unit transmits a pseudo random bit sequence 247 that is effectively used as a place holder until the central message is received and processed. In alternative embodiments, the remote message could be repeated or additional information transmitted in the place of the pseudo random bit sequence. Similarly, after the central message is transmitted, the central unit transmits a pseudo random bit sequence 249 that is effectively used as a place holder to maintain synchronization until the remote ready signal 251 has been received and processed.

When the remote unit 22 receives the central message, it processes the received message and returns remote ready signal 251 when it is ready to begin data transmission. By way of example, in the DMF modulation example, the remote may compute its FEQ taps and setup the interleaver (if the interleaver is enabled). When the central unit receives the remote ready signal 251, it returns a central ready signal 253. The central ready signal indicates either explicitly or implicitly exactly when the first data frame will be sent. For example, the central ready signal may designate the specific superframe at which data transmission will begin, or data transmission may begin a set number of superframes after the central ready signal is sent. Once the central ready signal is sent, both the central and remote units can count the frames before data will be sent and initialize data transmission at the appropriate time. In the described initialization sequence, the central ready signal is the first and only timing critical signal.

As pointed out above, in one preferred embodiment, several of the signals that are transmitted during the initialization sequence are composed of a series of header symbols. Such header superframes are well suited for marking the transition between signals transmitted by a particular modem, as for example: the transition between the central synchronization and the central setup signals 233, 237; the transition between the remote synchronization and remote setup signals 235, 239; the transition between the remote setup and remote message signal 239, 243; the transition between the between the central setup complete and central message signals; and the beginning of the remote and central ready signals.

In the event that an error is detected at any point, rather then sending the header superframe for the next signal, a readily detectable error signal may be sent either in its place, or (when appropriate) as soon as the error is detected. The error signal may take any suitable form. By way of example a superframe of symbols that are the inverse of the header symbol may be used. For example, if the header symbol contemplates turning on every even tone and turning off every odd tone, the error symbol could be the reverse. When an error superframe is sent and detected, both the sending and receiving modems may be reset to the most logical starting point. For example, if the error message is received by the remote unit instead of the central message 245, the remote unit may be reset to retransmit the remote message 243.

Figure 10:
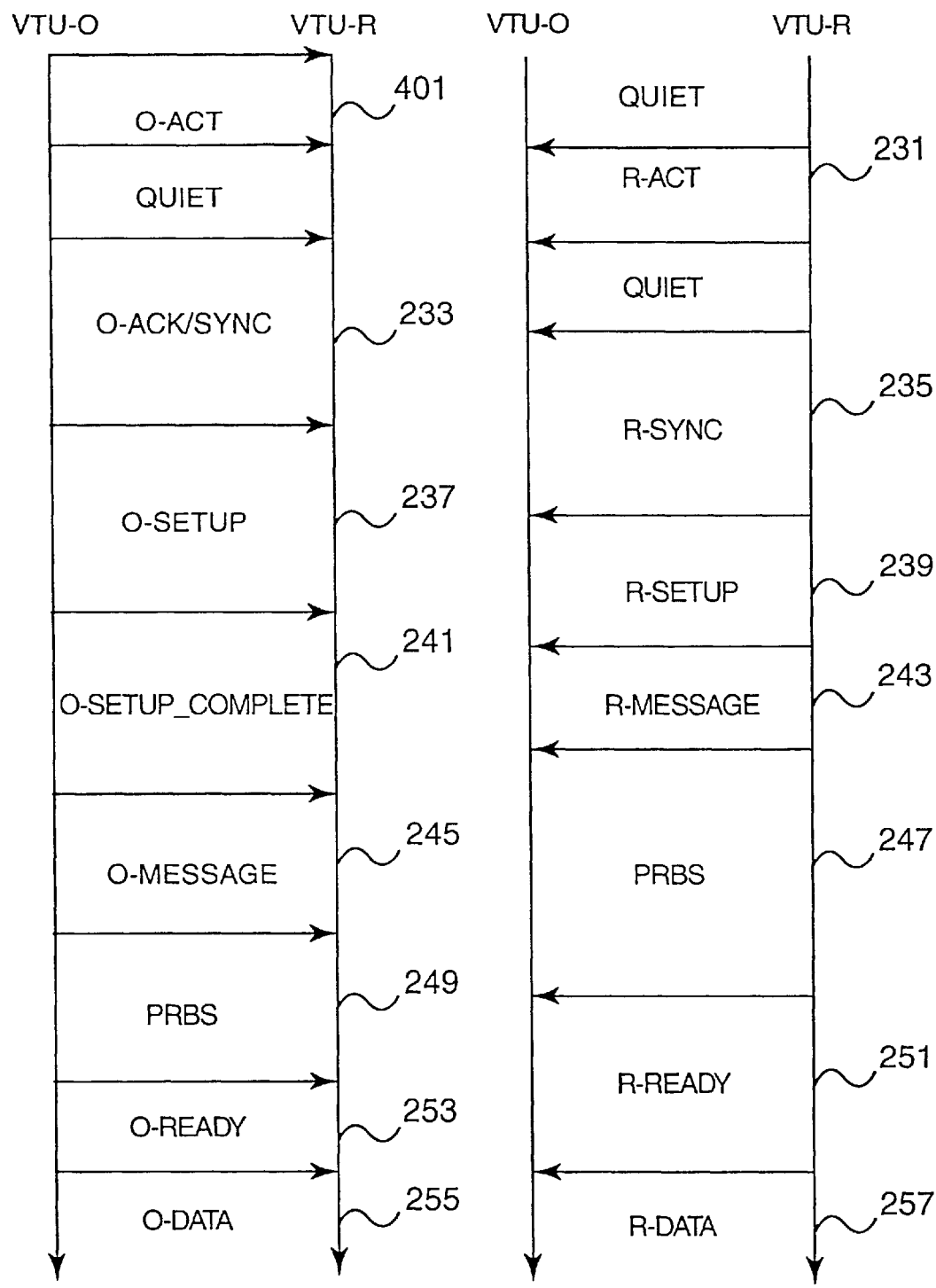
FIG. 10 is an initialization timing diagram in accordance with an alternative embodiment of the present invention.

In the embodiment described above with respect to FIG. 5, connections initiated by the central unit begin with the transmission of a central synchronization signal 233 to the remote unit. Although this works well in many instances, it has been observed that in some implementations, cross-talk between two telephone lines that share a binder may cause the central synchronization signal to inadvertently activate a neighboring remote unit in addition to the intended remote unit. Referring next to FIG. 10, an alternative embodiment that utilizes a central activation signal that is analogous to the remote activation signal 210 will be described. In this embodiment, when the central unit 10 initiates a connection, it begins by sending a central activation signal 401 to the remote unit 22. Like the remote activation signal 210, the central activation signal 401 may take a wide variety of forms, as for example the form illustrated in FIG. 4. That is, a relatively long duration single frequency signal. Again, the duration of the central activation signal may be widely varied, and the single superframe duration as described above with respect to the remote activation signal works well. The central activation signal may have a uniform intensity, or it may begin with a ramp-up and end with a ramp-down as described with respect to the remote initialization signal. Generally, the ramping is less important in the central activation signal since it will always be synchronized.

The central activation signal 210 can be transmitted on any suitable carrier. In one preferred embodiment, the central activation signal is transmitted on a different carrier then the remote activation signal 210. By way of example, tone eight (8) is suggested in one proposal. The manner in which the central activation signal 401 is incorporated into the initialization timing sequence can also be adjusted to meet the needs of a particular system. In the embodiment shown in FIG. 10, the central activation signal 401 causes the remote unit to "wake-up" and transmit the remote activation signal 210. The initialization sequence can then proceed as described above with respect to FIG. 5. Alternatively, the central activation signal can simply take the form of a prefix for the central synchronization signal 233. That is, it may immediately precedes the central synchronization signal 233. By way of example, in one embodiment, the first superframe of the central synchronization signal takes the form of the central activation signal 210 and the remaining superframes of the central synchronization signal proceed as described above with respect to FIG. 5. Again, the remainder of the initialization sequence can then proceed as previously discussed.

Figure 9:
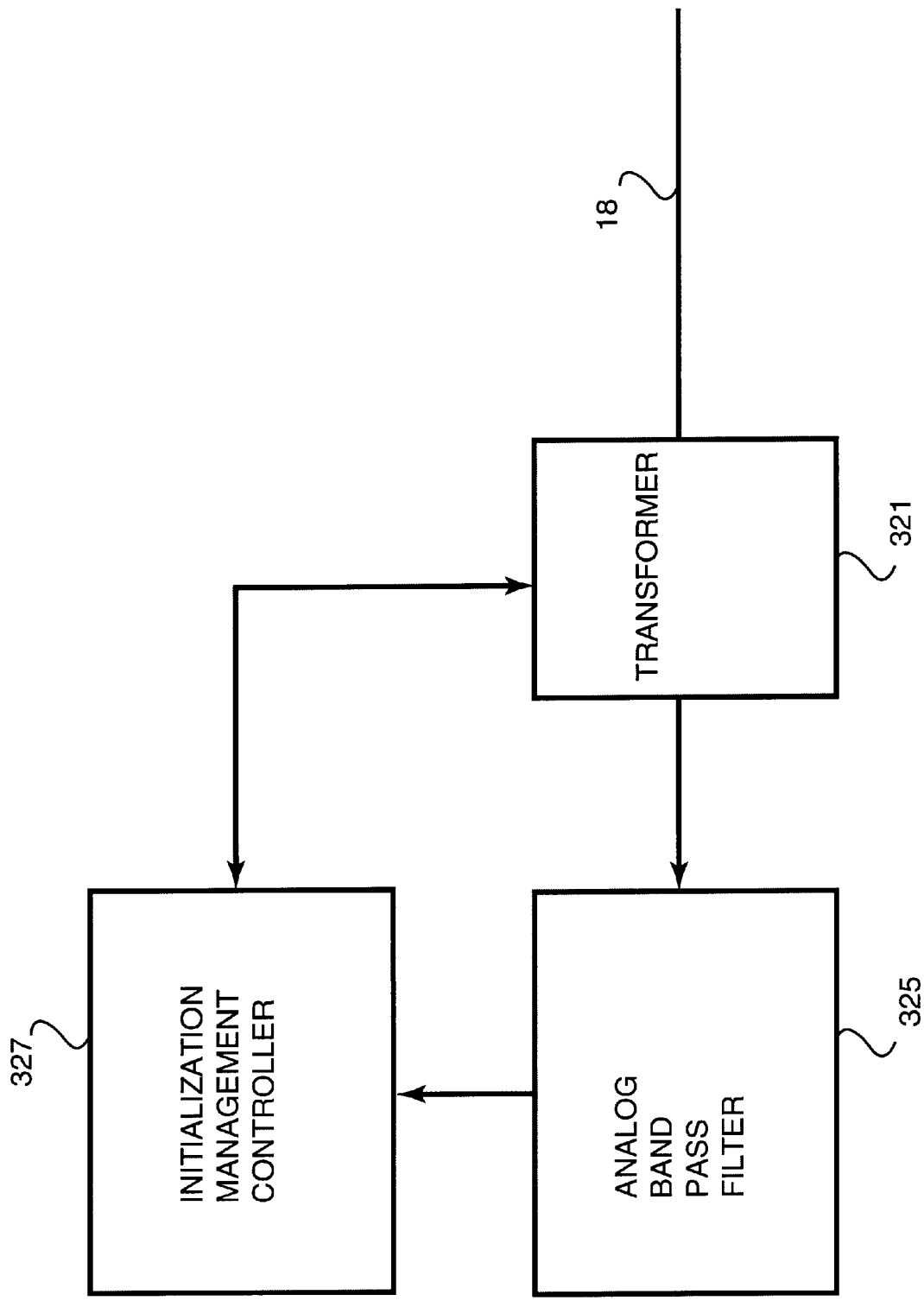
FIG. 9 is a block diagram illustrating a central office initializer suitable for implementing the present invention.

Referring next to FIG. 9, one embodiment of a central office initializer suitable for implementing the present invention will be described. In the embodiment shown, the central unit 10 includes a transformer 321 that is coupled to transmission line 18. The transformer 321 is provided before the heart of the central modem itself to facilitate DC isolation. The transformer also feeds analog band pass filter 325 which is arranged to detect the remote activation signal and send an interrupt to initialization management controller 327 when a remote activation signal is received. With such an arrangement, the band pass filter 325 effectively acts as an "analog ear" that listens for remote activation signals 201 on the transmission line 18. When a remote activation signal is detected, an interrupt is passed to the initialization management controller 327, which in turn begins and manages the described initialization sequence from the standpoint of the central unit. When the initialization sequence has been completed, control is passed to a modem controller (not shown) which may be substantially conventional in design. The initialization management controller may be provided as a separate chip, or it may be integrated into a larger unit.

The remote unit also includes a remote initialization management controller that is capable of generating or causing the generation of the remote activation signal, as well as the rest of the initialization sequence from the standpoint of the remote unit.

Although only a few embodiments have been described, it should be understood that the present invention may be embodied in many other specific forms without departing from the spirit or scope of the invention. For example, most of the examples have been described primarily in the context of a communication system that uses discrete multi-tone modulation since that is the modulation scheme that is most familiar to the inventors. However the various described features of the initialization scheme can be readily applied to a wide variety of multi-carrier modulation schemes. Further, in order to avoid unnecessary confusion, no effort has been made to identify every bit of information that must be passed back and forth for a particular multi-carrier modulation scheme since that will vary a great deal based upon both the modulation scheme chosen and a number of design choices. However, more details about specific information that may be passed back and forth for one DMr implementation is described in parent provisional application No. 60/078,549, filed Mar. 19, 1998 and entitled MULTI-CARRIER INITIALIZATION PROCEDURE, which is incorporated herein by reference in its entirety. Other details are provided in the ADSL standard document.

Although a specific implementation of the remote activation signal has been described, it should be appreciated that a wide variety of alternative structures may be used as well. By way of example, in the described embodiment the duration of the remote activation signal has been described as being one super-frame. However it could be longer or shorter then a superframe as desired for a particular implementation. The ramp up and ramp down portions of the remote activation signal have been described as gradual, however, in some implementations they could be zero while in others the ramp down may begin where the ramp up ends. Similarly, the structure of the header and error symbols and superframes may be widely varied, as may the number of symbols in each superframe that are interpreted by the respective receiving units. In one embodiment, the central setup signal includes information on how the remote unit should control its transmit spectrum. Such information, can alternatively be transferred at another point in the sequence. Indeed several of the types of information transmitted may be transmitted at different times. In the case of the remote transmit spectrum control information, the important point is that the information be transmitted before the remote unit begins transmitting a full bandwidth signal.

The inventions have also been primarily described in the context of a point-to-point transmission system that uses subscriber lines as the transmission lines. However, the inventions are equally applicable to point-to-multipoint systems and are generally independent of the transmission medium used. Thus, coaxial cables, twisted pair phone lines, wireless systems and hybrids that incorporate two or more different media all work well. Additionally, the invention has been described in the context of communications between central and a remote units. Although the labels central and remote are useful in understanding the invention and are appropriate for a large number of implementations, it should be appreciated that the invention is not limited to central office to remote unit type communication system. Rather, the terms as used in both the specification and claims can generally be considered synonymous with "first" and "second" units wherein relative location is not important. Therefore, the present examples are to be considered as illustrative and not restrictive, and the invention is not to be limited to the details given herein, but may be modified within the scope of the appended claims.

What is claimed is:

1. A method of initializing a connection between a pair of modems in a communications system arranged to utilize a multi-carrier modulation scheme, the method comprising the steps of:

transmitting an activation signal from a first modem unit, the activation signal having a duration approximately equal to a superframe which defines a plurality of symbols, the activation signal being of a single frequency and having a ramp up period that is at least the duration of one of the symbols and a ramp down period that is at least the duration of one of the symbols.

2. A method as recited in claim 1 wherein the activation signal is transmitted on a sub-carrier that is outside a range of sub-channels used for data transmission in the multi-carrier modulation scheme.

3. A method as recited in claim 1 wherein after transmission of the activation signal, the first unit listens for a synchronization signal transmitted from a second modem unit and wherein if no synchronization signal is detected by the first unit within a predetermined period of time, the activation signal is retransmitted.

4. A method as recited in claim 3 wherein the activation signal is transmitted at a higher power each time it is retransmitted during a single initialization sequence.

5. A method as recited in claim 1 wherein the multi-carrier modulation scheme is selected from the group consisting of: discrete multi-tone modulation; discrete wavelet multi-tone modulation; and OFDM.

6. A method as recited in claim 1 wherein the multi-carrier modulation scheme is a 256 sub-channel discrete multi-tone modulation scheme wherein the activation signal is transmitted on tone four and tone five is the lowest data transmission tone.

7. A method of initializing a connection between a remote unit and a central unit in a bi-directional communication system that uses a multi-carrier modulation scheme, the method comprising the steps of:

transmitting a central synchronization signal from the central unit to the remote unit;

transmitting a remote synchronization signal from the remote unit to the central unit in response to the central synchronization signal;

transmitting a central setup signal from the central unit to the remote unit in response to the remote synchronization signal;

transmitting a remote setup signal from the remote unit to the central unit in response to the central setup signal;

transmitting a central setup complete signal from the central unit to the remote unit when the central unit has completed a central setup procedure;

transmitting a remote message from the remote unit to the central unit after the remote unit has completed a remote setup procedure and received the central setup complete signal;

transmitting a central message from the central unit to the remote unit, wherein the central message is transmitted after the remote message has been received by the central unit;

transmitting a remote ready signal from the remote unit to the central unit after the central message has been received by the remote unit; and transmitting a central ready signal from the central unit to the remote unit in response to the remote ready signal.

8. A method as recited in claim 7 further comprising the step of transmitting a remote activation signal from the remote unit, the remote activation signal being a single frequency and having a ramp up period that is the duration of at least one symbol of a superframe, and a ramp down period that is at least the duration of the one symbol of the superframe, and wherein the central synchronization signal is transmitted in response to the activation signal.

9. A method as recited in claim 7 wherein the central setup signal includes training signals, the method further comprising the steps of:

computing sub-carrier line parameters at the remote unit based at least in part on an analysis of the received training signals, wherein the computed sub-carrier line parameters are transmitted from the remote unit to the central unit as part of the remote message; and calculating a desired sub-carrier bit distribution at the central unit based at least in part upon the sub-carrier line parameters, wherein the desired sub-carrier bit distribution is transmitted from the central unit to the remote unit as part of the central message.

10. A method as recited in claim 9 wherein:

the sub-carrier line parameters include sub-carrier signal to noise ratios for each of a plurality of sub-carriers; and the sub-carrier bit distribution is presented in the form of a bit allocation table that identifies the number of bits that may be transmitted on each symbol for each sub-carrier that is available to the remote unit for data transmission.

11. A method as recited in claim 9 further comprising the step of calculating a desired power distribution indicative of the power level that the remote unit should use for each sub-carrier that is available to the remote unit for data transmission, the desired power distribution being calculated at the central unit and transmitted from the central unit to the remote unit as part of the central message.

12. A method as recited in claim 7 wherein:

during a first superframe of each of the recited signals, the transmitting unit sends only header symbols which constitute a first predetermined pattern; and in the event that an error is detected, the unit that detects the error transmits designated error symbols which constitute a second predetermined pattern.

13. A method as recited in claim 7 wherein:

during a first superframe of the central setup signal, a plurality of header symbols having a first predetermined pattern are transmitted and during a plurality of following superframes of the central setup signal, a sequence of training symbol sets are transmitted; and during the transmission of the central setup complete signal, the sequence of training symbol sets continue to be retransmitted and a designated symbol in each superframe that is not to be used by the remote unit to obtain training information is set to a state indicative of the completion of the central setup procedure;

whereby a synchronous setup of the central unit and the remote unit is facilitated since. the remote unit may continue to receive the training symbol set even after the central setup procedure has been completed.

14. A method as recited in claim 13 further comprising the steps of:

computing sub-carrier line parameters at the remote unit based at least in part on an analysis of the received training signals; and transmitting a remote message to the central unit that includes the computed sub-carrier line parameters.

15. A method as recited in claim 14 wherein the sub-carrier line parameters include parameters selected from the group consisting of:

sub-carrier signal to noise ratios for each of a plurality of sub-carriers; and a desired sub-carrier bit distribution.

16. A method of determining a desired sub-carrier bit distribution for transmissions between a remote unit and a central unit in a bidirectional communication system that uses a multi-carrier modulation scheme, the method comprising the steps of:

transmitting training signals from the central unit to the remote unit;

computing sub-carrier line parameters at the remote unit and transmitting the sub-carrier line parameters to the central unit, wherein the computed sub-carrier line parameters are based at least in part on an analysis of the received training signals; and calculating a desired sub-carrier bit distribution at the central unit and transmitting the desired sub-carrier bit distribution from the central unit to the remote unit, wherein the desired sub-carrier bit distribution is calculated at least in part based upon the received sub-carrier line parameters.

17. A method as recited in claim 16 wherein the sub-carrier line parameters include sub-carrier signal to noise ratios for each of a plurality of sub-carriers.

18. A method as recited in claim 16 wherein the sub-carrier bit distribution is presented in the form of a bit allocation table that identifies the number of bits that may be transmitted in each symbol for each sub-carrier that is available to the remote unit for data transmission.

19. A method as recited in claim 16 further comprising the step of calculating a desired power distribution indicative of the power level that the remote unit should use for each sub-carrier that is available to the remote unit for data transmission.

20. A method of asynchronously establishing a connection between a central unit and a remote unit in a bi-directional communication system that uses a multi-carrier modulation scheme, the method comprising the steps of:

transmitting a central setup signal from the central unit to the remote unit, wherein, during a first superframe of the central setup signal, a plurality of header symbols are transmitted and during a plurality of following superframes of the central setup signal, a sequence of training symbol sets are transmitted; and transmitting a central setup complete signal from the central unit to the remote unit when the central unit has completed a central setup procedure, wherein during the transmission of the central setup complete signal, the sequence of training symbol sets continue to be retransmitted and a designated symbol in each superframe that is not to be used by the remote unit to obtain training information is set to a state indicative of the completion of the central setup procedure;

whereby a synchronous setup of the central unit and the remote unit is facilitated since the remote unit may continue to receive the training symbol set even after the central setup procedure has been completed.

21. A method as recited in claim 20 further comprising the steps of:

computing sub-carrier line parameters at the remote unit based at least in part on an analysis of the received training signals; and transmitting a remote message to the central unit that includes the computed sub-carrier line parameters.

22. A method as recited in claim 21 wherein the sub-carrier line parameters includes parameters selected from the group consisting of:

sub-carrier signal to noise ratios for each of a plurality of sub-carriers;

a desired sub-carrier bit distribution; and a bit allocation table that identifies the number of bits that may be transmitted in each symbol for each sub-carrier that is available to the remote unit for data transmission.

23. A method as recited in claim 21 further comprising the steps of:

transmitting a remote message from the remote unit to the central unit after the remote unit has completed a remote setup procedure and received the central setup complete signal;

transmitting a central message from the central unit to the remote unit, wherein the central message is transmitted after the remote message has been received by the central unit;

transmitting a remote ready signal from the remote unit to the central unit after the central message has been received by the remote unit; and transmitting a central ready signal from the central unit to the remote unit in response to the remote ready signal.

24. A method as recited in claim 20 wherein a plurality of intermediate information superframes are transmitted between the first superframe and the following superframes that contain the sequence of training symbol sets.

25. A method as recited in claim 24 wherein the intermediate information superframes contain information used by the remote unit to control its transmit spectrum.

26. A method of initializing a connection between a pair of modems in a communications system arranged to utilize a multi-carrier modulation scheme, the method comprising the steps of:

transmitting an activation signal from a first modem unit, the activation signal being a single frequency and having a ramp up period that is the duration of at least one symbol of a superframe and a ramp down period that is at least the duration of the one symbol of the superframe.

* * * * *